United States Patent [19]

Hildebrand et al.

[11] 4,081,361

[45] Mar. 28, 1978

[54] PROCESS FOR THE CONVERSION OF CARBONACEOUS MATERIALS

[75] Inventors: Richard E. Hildebrand, Glenshaw; Angelo A. Montagna, Monroeville; John A. Paraskos, Pittsburgh, all of Pa.

[73] Assignee: Gulf Research & Development Company, Pittsburgh, Pa.

[21] Appl. No.: 708,290

[22] Filed: Jul. 26, 1976

[51] Int. Cl.$^2$ .............................................. C10G 1/08
[52] U.S. Cl. .............................................. 208/10
[58] Field of Search ...................................... 208/10

[56] References Cited

U.S. PATENT DOCUMENTS

| | | | |
|---|---|---|---|
| 2,118,940 | 5/1938 | Pier et al. | 208/10 |
| 3,725,246 | 4/1973 | Kmecak et al. | 208/10 |
| 3,840,473 | 10/1974 | Benther et al. | 252/439 |
| 3,997,426 | 12/1976 | Montagna et al. | 208/10 |

Primary Examiner—Veronica O'Keefe
Assistant Examiner—James W. Hellwege

[57] ABSTRACT

A process for converting solid carbonaceous material to a liquid product which involves heating a slurry composed of the solid carbonaceous material and a solvent, together with hydrogen, at elevated temperatures and elevated pressures in the presence of a substantially phosphate-free catalyst comprising a hydrogenating component selected from the group consisting of Group VI and Group VIII metals, their oxides and sulfides, supported on a non-zeolitic carrier, which catalyst is promoted with a minor amount of a Group IV-B metal.

9 Claims, 3 Drawing Figures

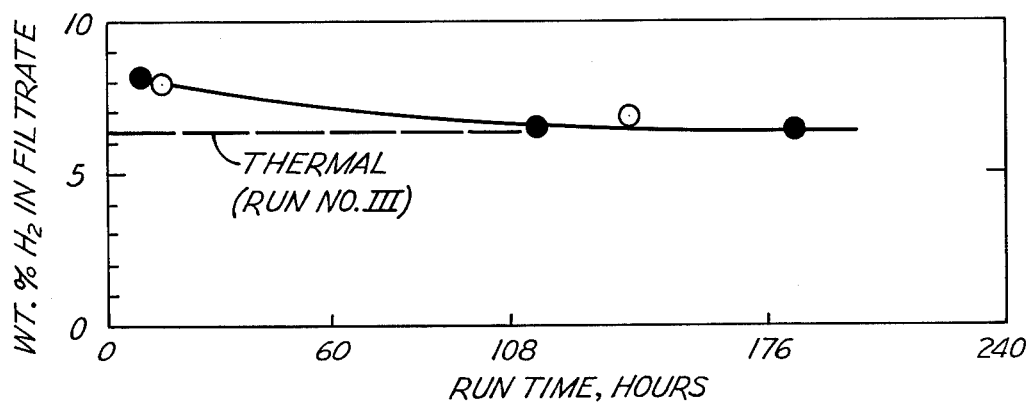
Fig. II
○ — RUN NO. I    ● — RUN NO. II
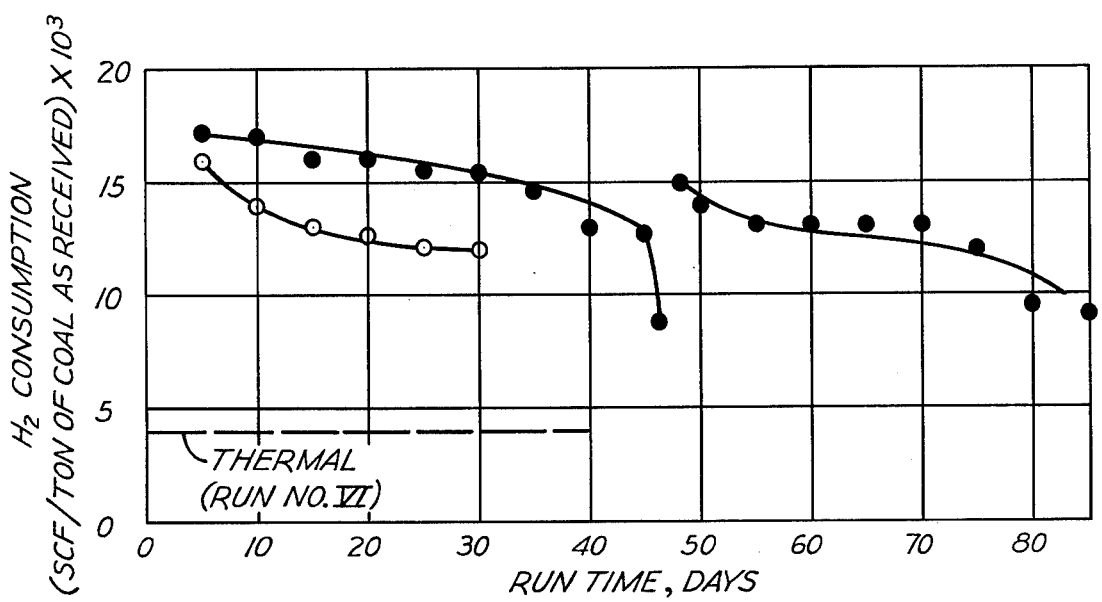
Fig. III
○ — RUN NO. IV    ● — RUN NO. V

PROCESS FOR THE CONVERSION OF CARBONACEOUS MATERIALS

BACKGROUND OF THE INVENTION

This invention relates to a process for converting a solid carbonaceous material to a liquid product in which a slurry composed of said solid carbonaceous material, together with hydrogen, is heated at elevated temperatures and elevated pressures in the presence of a substantially phosphate-free catalyst comprising a hydrogenating component selected from the group consisting of Group VI and Group VIII metals, their oxides and sulfides, supported on a non-zeolitic carrier, which catalyst is promoted with a minor amount of a Group IV-B metal.

SUMMARY OF THE INVENTION

The conversion of solid carbonaceous materials to a liquid by heating a slurry of said solid carbonaceous material, together with hydrogen, at elevated temperatures and elevated pressures in the presence of a solid, metal-containing catalyst is known. However, it is difficult to carry out such processes for extended periods of time, since the catalyst has a tendency to be quickly deactivated and therefore the processes must be terminated periodically to regenerate the catalyst or to replace the deactivated catalyst. We have found that if such processes are carried out in the presence of a substantially phosphate-free catalyst comprising a hydrogenating component selected from the group consisting of Group VI and Group VIII metals, their oxides and sulfides, supported on a non-zeolitic carrier, which catalyst is promoted with a minor amount of a Group IV-B metal, the processes can be carried out for extended periods of time before appreciable deactivation of the catalyst takes place.

The solid carbonaceous materials that can be used herein can have the following composition on a moisture-free basis:

|  | Weight Percent | |
| --- | --- | --- |
|  | Broad Range | Normal Range |
| Carbon | 45 – 95 | 60 – 92 |
| Hydrogen | 2.5 – 7.0 | 4.0 – 6.0 |
| Oxygen | 2.0 – 45 | 3.0 – 25 |
| Nitrogen | 0.75 – 2.5 | 0.75 – 2.5 |
| Sulfur | 0.3 – 10 | 0.5 – 6.0 |

The carbon and hydrogen content of the carbonaceus material will reside primarily in benzene compounds, multi-ring aromatic compounds, heterocyclic compounds, etc. Oxygen and nitrogen are believed to be present primarily in chemical combination with the aromatic compounds. Some of the sulfur is believed to be present in chemical combination with the aromatic compounds and some in chemical combination with inorganic elements associated therewith, for example, iron and calcium.

In addition to the above, the solid carbonaceous material being treated herein may also contain solid, primarily inorganic, compounds which will not be convertible to liquid product herein, which are termed as "ash," and are composed chiefly of compounds of silicon, aluminum, iron and calcium, with smaller amounts of compounds of magnesium, titanium, sodium and potassium. The ash content of a carbonaceous material treated herein will amount to less than 50 weight percent, based on the weight of the moisture-free carbonaceous material, but in general will amount to about 0.1 to about 30 weight percent, usually about 0.5 to about 20 weight percent.

Anthracitic, bituminous and subbituminous coal, lignitic materials, and other types of coal products referred to in ASTM D-388 are exemplary of the solid carbonaceous materials which can be treated in accordance with the process of the present invention to produce upgraded products therefrom. When a raw coal is employed in the process of the invention, most efficient results are obtained when the coal has a dry fixed carbon content which does not exceed 86 percent and a dry volatile matter content of at least 14 percent by weight as determined on an ash-free basis. The coal, prior to use in the process of the invention, is preferably ground in a suitable attrition machine, such as a hammermill, to a size such that at least 50 percent of the coal will pass through a 40-mesh (U.S. Series) sieve. The ground coal is then dissolved or slurried in a suitable solvent. If desired, the solid carbonaceous material can be treated, prior to reaction herein, using any conventional means known in the art, to remove therefrom any materials forming a part thereof that will not be converted to liquid herein under the conditions of reaction.

Any liquid compound, or mixtures of such compounds, having hydrogen transfer properties can be used as solvent herein. However, liquid aromatic hydrocarbons are preferred. By "hydrogen transfer properties" we mean that such compound can, under the conditions of reaction herein absorb or otherwise take on hydrogen and also release the same. A solvent found particularly useful as a startup solvent is anthracene oil defined in Chamber's Technical Dictionary, MacMillan, Great Britain 1943, page 40, as follows: "A coal-tar fraction boiling above 518° F., consisting of anthracene, phenanthrene, chrysene, carbazole and other hydrocarbon oils." Other solvents which can be satisfactorily employed are those which are commonly used in the Pott-Broche process. Examples of these are polynuclear aromatic hydrocarbons such as naphthalene and chrysene and their hydrogenated products such as tetralin (tetrahydronaphthalene), decalin, etc. or one or more of the foregoing in admixture with a phenolic compound such as phenol or cresol.

The selection of a specific solvent when the process of the present invention is initiated is not critical since a liquid fraction which is obtained during the defined conversion process serves as a particularly good solvent for the solid carbonaceous material. The liquid fraction which is useful as a solvent for the solid carbonaceous material, particularly coal, and which is formed during the process, is produced in a quantity which is more than sufficient to replace any solvent that is converted to other products or which is lost during the process. Thus, a portion of the liquid product which is formed in the process of the invention is advantageously recycled to the beginning of the process. It will be recognized that as the process continues, the solvent used initially becomes increasingly diluted with recycle solvent until the solvent used initially is no longer distinguishable from the recycle solvent. If the process is operated on a semicontinuous basis, the solvent which is employed at the beginning of each new period may be that which has been obtained from a previous operation. For example, liquids produced from coal in accordance with the present invention are aromatic and generally have a boiling range of about 300° to about 1400° F., a density of about 0.9 to about 1.1 and a carbon to hydrogen mol ratio in the range of about 1.3:1 to about 0.66:1. A solvent oil obtained from a subbituminous coal, such as Wyoming-Montana coal, comprises a middle oil having a typical boiling range of about 375° to about 675° F. Thus, the solvent that is employed herein can broadly be defined as that obtained from a previous conversion of a carbonaceous solid material in accordance with the process defined herein. Although we have used the term "solvent", it is understood that such term covers the liquid wherein the liquid product obtained herein is dissolved as well as the liquid in which the solid materials are dispersed.

The ratio of solvent to solid carbonaceous material can be varied so long as a sufficient amount of solvent is employed to effect dissolution of substantially all of the solid carbonaceous material in the reaction vessel. While the weight ratio of solvent to solid carbonaceous material can be within the range of about 0.6:1 to about 4:1, a range of about 1:1 to about 3:1 is preferred. Best results are obtained when the weight ratio of solvent to solid carbonaceous material is about 2:1. Ratios of solvent to solid carbonaceous material greater than about 4:1 can be used but provide little significant functional advantage in dissolving or slurrying the solid carbonaceous material for use in the process of this invention. An excessive amount of solvent is undesirable in that added energy or work is required for subsequent separation of the solvent from the system.

In accordance with the present invention, the slurry and hydrogen are maintained at a temperature between about 260° and about 480° C., preferably about 350° to about 450° C., at a pressure between about 500 and about 10,000 pounds per square inch gauge (psig) [about 35.1 to about 703 kilograms per square centimeter], but preferably at a pressure between about 3700 and about 6000 psig [about 260 to about 422 kilograms per square centimeter], but most preferably about 3800 to about 4000 pounds per square inch gauge [about 267 to about 281 kilograms per square centimeter], utilizing a weight hourly space velocity (WHSV) between about 0.25 and about 50 pounds of solid carbonaceous material per pound of catalyst per hour, and added hydrogen in amounts between about 2000 and about 20,000 standard cubic feet (SCF) per barrel of slurry. The exact conditions selected will depend, for example, upon the amount of catalyst, the particular charge stock to be treated, and the degree of conversion desired, etc. It is desirable to utilize as low a temperature as possible and still obtain the desired results. This is due to the fact that the degree of activation or promotion of the catalyst can become more pronounced at the lower reaction temperatures. The hydrogen recycle rate does not vary significantly with various charge stocks and preferably should be between about 2000 and about 10,000 standard cubic feet per barrel of slurry.

The catalyst employed herein must be the catalyst defined and claimed in U.S. Pat. No. 3,840,473. Specifically, the catalyst is a substantially phosphate-free catalyst comprising a hydrogenating component selected from the group consisting of Group VI and Group VIII metals, their oxides and sulfides, supported on a non-zeolitic carrier, which catalyst is promoted with a minor amount of a Group IV-B metal.

It is important that the catalyst employed in our process contain substantially no phosphates. While the presence of phosphorous or phosphates in the catalyst can be tolerated on the contaminant level, i.e. less than about 0.5 percent by weight and preferably less than about 0.1 percent by weight, it is desired that no phosphates be present at all. Phosphate levels even as low as about 1 percent by weight have an adverse affect upon the catalytic activity and a phosphate content approaching 2 percent by weight is completely unacceptable.

The carrier or support employed in the catalyst can be any non-zeolitic refractory oxide having a surface area in excess of 3 m.$^2$/g. such as pure alumina, a so-called silica stabilized alumina containing up to about 5 percent by weight based upon the carrier of silica, silica gels, acid leached boro-silicate glass and spinels, e.g. magnesium aluminate. Preferably, however, we employ an alumina carrier which is silica-free. Additionally, we prefer the carrier to be substantially free from the incorporation therein of refractory metal oxides, other than alumina, such as, thoria, boria, titania, magnesia, zirconia, etc., although the Group IV-B metals are to be added to the total catalyst. In any event, the preferred alumina employed in our process is a transition alumina, such as eta or gamma alumina.

The hydrogenating component employed in the catalyst can be one of or a combination of the Group VI and Group VIII metals or their oxides or sulfides. We prefer to employ catalysts containing a combination of Group VI and Group VIII metalliferous components and particularly we prefer to employ such components in an atomic ratio of Group VIII metal to Group VI metal of at least 1:0.3, preferably at least about 1:0.5 and more preferably at least about 1:1.0. Generally, we do not employ such catalyst with a Group VIII to Group VI atomic ratio in excess of about 1:5, preferably an atomic ratio of less than about 1:3.5, and more preferably an atomic ratio of less than about 1:2.5. We find a particularly preferred catalyst contains the Group VIII and Group VI metals in an atomic ratio of less than about 1:1.75. Further, the catalysts have a total Group VI plus Group VIII metals content of at least about 5 percent by weight based upon the total catalyst and preferably at least about 8 percent by weight. As a general rule, we do not employ catalyst containing more than about 30% by weight metals and usually restrict total Group VI and Group VIII metal content to less than about 20% by weight. Preferred catalysts for use in our process can be comprised of combinations of the iron group metals and Group VI metals such as molybdenum and tungsten. Of the iron group metals we prefer to employ cobalt and nickel, with nickel being particularly preferred, and of the Group VI metals we prefer to employ molybdenum. Further, we prefer not to use chromium in the absence of other Group VI metals. Illustrative of particularly preferred catalyst for use in our invention are combinations of nickel-molybdenum and cobalt-molybdenum.

It is also a requirement that the catalyst employed be promoted with a Group IV-B metal, i.e. titanium, zirconium or hafnium. Accordingly, we employ catalysts containing at least 1 percent by weight Group IV-B metal based upon the total catalyst and preferably containing at least about 2.5 percent by weight. While there does not appear to be any upper limit on the maximum amount of Group IV-B metal which can be employed, there does not appear to be any advantage to employing more than about 10 percent by weight based upon the total catalyst of such metal. Preferably, we employ catalysts containing less than about 8 percent by weight Group IV-B metal. Of the Group IV-B metals (titanium, zirconium and hafnium), we prefer to employ titanium and zirconium with titanium being particularly preferred.

The particle size of the catalyst, if composited, can suitably be from about 1/32 inch diameter to about ¼ inch diameter extrudate, or about 1/32 inch to about ¼ inch diameter spheroids. The preferred size of the catalyst particles will depend, for example, upon the size of the openings in the porous partitions of the reaction vessel, defined below, and upon the size of the catalyst sections in the commercial vessel. In general, the larger the catalyst sections in the commercial vessel, the larger should be the catalyst particle size. The catalyst can also be in the form of pellets or any other geometrical form, so long as the catalyst does not pass through the openings in the partitions separating the catalyst bed segments from the unobstructed passageways.

When treating a carbonaceous material, such as a coal slurry, according to the process of the invention, it is customary to continue the reaction until the catalyst activity has decreased markedly due to the deposition of ash and/or coke or other carbonaceous material thereon. In the process of the present invention, the reaction will continue over an extended period of time before regeneration of the catalyst is required. When regeneration of the catalyst becomes necessary, the catalyst can be regenerated by combustion, i.e., by contact with an oxygen-containing gas such as air at an elevated temperature usually about 900° F. or by any other means normally used to regenerate hydrogenation catalysts. The manner in which the catalyst is regenerated does not constitute a portion of the present invention.

The process of the invention will be more readily understood by referring to FIG. 1, which is a schematic flow diagram of one embodiment of the invention showing the use of a preferred form of a multi-partitioned reaction vessel wherein the cross-sectional segments of the vertical reaction zones are sectors. While the process described in FIG. 1 is with reference to the treatment of raw coal, it is to be understood that any solid carbonaceous material, as defined herein, having a tendency to form coke and/or ash during conversion can suitably be treated by the process of this invention. Coal is simply exemplary of the carbonaceous materials which can be treated in the process of the invention.

Referring to FIG. 1, a carbonaceous solid material, such as raw coal, is introduced into coal preparation unit 10 through line 8. In coal preparation unit 10, the coal is ground by a suitable machine such as a hammer-mill to a size, for example, such that 50 percent of the coal will pass through a 40 mesh sieve (U.S. Series). Ground coal particles are transferred from coal preparation unit 10 through line 12 into a slurry blending unit 14 where the coal is mixed with a solvent in a weight ratio of solvent to coal of about 1:1 to about 3:1. When the process is initiated, fresh solvent, such as anthracene oil, is introduced into slurry blending unit 14 through line 16. As the process continues, a sufficient amount of solvent oil is produced so that fresh solvent is gradually replaced by recycle solvent oil which is introduced into slurry blending unit 14 through line 18. If desired, all or a portion of the solvent can be passed through line 20 to line 12 to aid in transferring ground coal to slurry blending unit 14. A slurry of coal particles and solvent is removed from slurry blending unit 14 through line 22, where it is mixed with high pressure hydrogen supplied through line 26. The mixture of coal, oil and hydrogen is then introduced into the bottom of reaction vessel 24.

If desired, the oil-coal mixture in line 22 may be preheated by any suitable heat exchange means (not shown) prior to being introduced into reaction vessel 24. While the mixture of coal, solvent and hydrogen is shown as being introduced into the bottom of reaction vessel 24 for upflow operation, the mixture can be introduced into the top of reaction vessel 24 for downflow operation. Preferably, however, the mixture of coal, solvent and hydrogen is introduced into the bottom of reaction vessel 24 and passed upflow through reaction vessel 24 is a flooded-bed type reaction system. While the hydrogen is shown as being introduced together with the coal and solvent into the bottom of reaction vessel 24, the hydrogen can be introduced at multiple places through the reaction vessel. Similarly some of the coal and/or solvent can be introduced at multiple places throughout the reactor.

The hydrogen is introduced into reaction vessel 24 in amounts between about 2000 and about 20,000 standard cubic feet of hydrogen per barrel of coal slurry. The hydrogen gas stream is preferably at least about 60 percent hydrogen, the remainder of the gas stream being gases such as nitrogen, carbon monoxide, carbon dioxide and/or low molecular weight hydrocarbons, such as methane. The exact reaction conditions in reaction vessel 24 depend upon a number of factors, for example, the amount of liquefaction desired, but, in general, must include temperatures and pressures within the ranges previously defined hereinabove. The weight hourly space velocity of the coal slurry is suitably from about 0.25 to about 40, usually about 0.5 to about 20 unit weight of charge stock per unit weight of catalyst per hour. The catalyst will be the hydrogenation catalyst as defined hereinabove. The particle size of the catalyst will depend upon the size of the reaction vessel and upon the size of the openings in the porous partitions of the reaction vessel. The particles of catalyst are sufficiently large so that they do not pass through the openings in the porous partitions.

Reaction vessel 24 may contain one segmented basket 28 or it may contain a number of such baskets stacked on top of each other so that the unobstructed passageways 30 and the catalyst-containing segments 32 are in direct line through the reaction vessel. Basket 28 is cylindrical in shape, the outer surface 34 of which may be solid, but is preferably provided with openings large enough to permit the transfer of reactants (including coal fines) and produces therethrough while retaining the catalyst particles 36 therein. The inner walls 38 of the partitions separating the catalyst segments from the unobstructed passageways are provided with openings large enough to permit the transfer of reactants (including coal fines) and products therethrough while not allowing catalyst particles to pass from the catalyst segments. In FIG. 1 the cross-sectional configuration of the segments in basket 28 are sectors.

Gases from reaction vessel 24 are removed through line 40 to a gas recovery plant 42. Gas recovery plant 42 comprises any suitable means for separating gases from liquids. The gases separated in gas recovery plant 42 are passed through line 44 to a hydrogen plant 46 where hydrogen is recovered and any low molecular weight hydrocarbon gases are converted to hydrogen. Depending upon economic considerations, the low molecular weight hydrocarbon gases can be sold and hydrogen generated by other satisfactory means, such as gasification of coal, or a product stream containing undesirable materials, such as high-boiling tars or waste solids, can be used as a hydrogen source. Hydrogen is then returned through line 26 to reaction vessel 24. Any makeup gas which is needed to supply hydrogen for the hydrogen plant is added through line 48. Liquid products containing some solid materials are removed from reaction vessel 24 through line 50 into a solids separation unit 52. If desired, solids separation unit 52 can be bypassed, for example, when substantially no solid materials are in the liquefied product, in which case the liquid product removed from reaction vessel 24 can be passed directly by line 51 to a product storage and recycle unit 58. Solids separation unit 52 comprises any suitable means for separating solids from liquids such as a continuous rotating filter, centrifuge, liquid cyclone or vacuum distillation. Solid materials are removed from the separation unit 52 through line 54. If the solid materials removed by line 54 contain some of the original carbonaceous materials, as in the case wherein it is desired not to solubilize all of the original carbonaceous material, and solid inorganic material, the two can be separated from each other by any means convenient in the art. The solid carbonaceous material will be upgraded, for example, to be lower in sulfur content than the original charge, and can be used as fuel. The inorganic materials, for example, ash, can be used as such, or after calcination, alone or in combination with another hydrogenation catalyst different from that present in the catalyst beds, as additional catalyst and introduced into the system along with the charge in line 22. In such case the "unobstructed, catalyst-free zones" referred to above will also contain catalyst to the extent of such addition. The liquid product is removed from separation unit 52 through line 56 to product storage and recycle unit 58, from which liquid product can be removed through line 60. A portion of the liquid product is recycled as solvent through line 18 and returned to slurry blending unit 14. Optionally, the liquid product from storage and recycle unit 58 can be sent through line 64 to a distillation column train 66 where various cuts can be removed at a desired pressure, usually under vacuum for the recovery of specific distillation cuts which can then be passed through line 68 to a storage tank farm 70. The various products can then be removed through line 72. In this manner specific solvent cuts can be removed and recycled as solvent through line 74 to slurry blending unit 14. It is believed obvious to those having ordinary skill in this art that by varying the reaction conditions in reaction vessel 24, but within the range of conditions set forth above, more or less hydrocracking can occur, which would give more or less liquefied product and/or more or less lighter boiling products for distillation in distillation column train 66. It is also within the purview of the disclosure herein that product in line 50 containing solids be sent directly to a distillation column train wherein the component parts thereof can be separated into selected fractions.

FIG. 1 shows cylindrical-type multi-partitioned reaction vessels, since reactors of this configuration are more common. It should be understood, however, that the geometrical shape is not critical and that square, reactangular, octagonal, elliptical, etc., designs can be employed. In the preferred embodiment shown in FIG. 1, it is only necessary that the reaction vessel contain a plurality of closely-spaced, substantially-vertical reaction zones, separated by porous partitions wherein a portion of the zones are adapted to contain solid particulate catalyst which will not pass through the porous partitions. Another portion of the reaction zones from substantially unobstructed passageways through the reaction vessel. In the drawing shown, the unobstructed passageways form an alternating symmetrical pattern with the catalyst-containing portions of the reaction vessel. While this is a preferred type of reaction system, it is not essential that a symmetrical-type design be employed. Similarly, it is not critical as to the precise number of segments.

The ratio of the cross-sectional area of total catalyst segments to total unobstructed passageways can vary over a wide range depending on the size of the reaction vessel. In general, the ratio of the total cross-sectional area of unobstructed passageways to the total cross-sectional area occupied by catalyst is preferably about 20:1 to about 1:10. Since the length of the catalyst segments and the length of the unobstructed passageways in any given reaction vessel are preferably the same, the volumetric ratio of total unobstructed passageways to total catalyst is also preferably the same as the cross-sectional area ratios, i.e., about 20:1 to about 1:10. The ratio of the total cross-sectional area occupied by catalyst to the total cross-sectional area (occupied plus unoccupied) of the reaction vessel is preferably about 10:1 to about 1:10, most preferably about 3:1 to about 1:3. The catalyst segments are preferably parallel to each other and to the unobstructed passageways and have a uniform cross-sectional area throughout the reaction vessel. It will be understood, however, that catalyst segments of varying cross-sectional areas can be employed and that the catalyst segments need not be parallel.

The size of the openings in the porous partitions separating the catalyst segments from the unobstructed passageways can vary. The openings must be sufficiently large to permit the passage of fines and ash from the unobstructed passageways to the catalyst segments and then back again to the unobstructed passageways. As the charge stock passes through the reaction vessel, it passes in and out and through the various catalyst segments and unobstructed passageways an indeterminate number of times. The openings are large enough to permit coal fines and ash to pass through but not large enough to allow catalyst particles to pass through. In general, the size of the openings in the porous partitions is within the range of about ½ inch to about 40-mesh sieve (U.S. Series), but usually the openings are from about 6 to about 20-mesh (U.S. Series). If the catalyst particles are about ¼-inch diameter, the size of the openings in the partitions are just under about ¼ inch in diameter. The configuration of the openings is not important and is dictated by the ease of fabrication of the partitions. Screen-like partitions have been used successfully to retain the catalyst while permitting easy passage of the coal slurry particles to and from the catalyst segments. Thus, catalyst particles approximately ⅛ inch in diameter will be retained where the porous partitions were made of screen wire having square openings approximately 0.079 inch in a side. The openings in the partitions can be circular, octagonal, square or any other shape. The ratio of open area to solid area in the porous partitions is preferably as high as possible consistent with good structural strength while retaining the catalyst particles.

DESCRIPTION OF PREFERRED EMBODIMENTS

Figure 1:
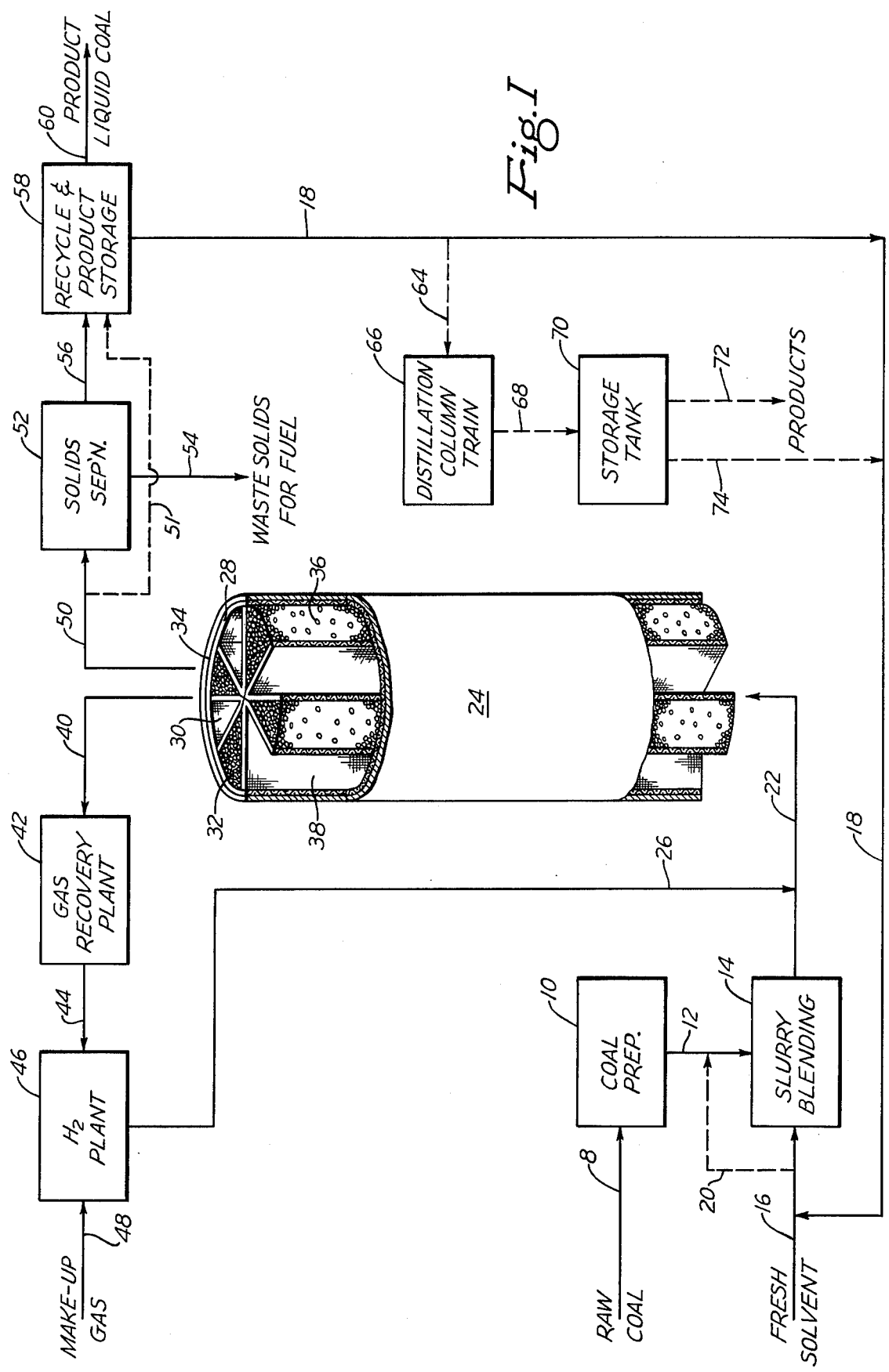

The present invention will be further described with reference to the following runs wherein a slurry containing 40 weight percent of a crushed (less than 40 mesh) Big Horn coal, having a moisture content of 21 weight percent, and anthracene oil were subjected to hydrogenation. The elemental analysis of the coal, on a moisture-free basis, and of the anthracene oil are set forth below in Table I.

TABLE I

| Elemental Analysis, Weight Per Cent | Big Horn Coal | Anthracene Oil |
|---|---|---|
| Carbon | 70.86 | 90.7 |
| Hydrogen | 5.26 | 5.97 |
| Nitrogen | 1.26 | 1.03 |
| Oxygen | 19.00 | 1.71 |
| Sulfur | 0.56 | 0.59 |
| Ash | 6.51 | 0.01 |

Six runs were made. In four of the six runs hydrogenation catalysts were charged into alternating sectorial segments of baskets which were housed in a 2⅜-inch diameter by 48-inch diameter reaction vessel similar to that shown in FIG. 1 having a total volume of 3485 cc. In two of the runs the catalyst used was an extrudate ⅛-inch diameter and from ¼-inch to ½-inch in length composed of a commercially-available alumina having a surface area of abut 175 square meters per gram carrying nickel, cobalt and molybdenum wherein the nickel amounted to 0.5 weight percent of the extrudate, the cobalt 1.0 weight percent and the molybdenum 8.0 weight percent. In hydrogenation reactions using this catalyst the amounts of metals as defined has been found to give optimum results. In another two runs, the catalyst was similar except that the extrudate carried 3.0 weight percent nickel, 5.0 weight percent titanium and 8.0 weight percent molybdenum. In the remaining runs an inert packing, crushed quartz chips having a size in excess of 8 mesh was used. In each of the runs the slurry as defined above was passed through the reaction zones with hydrogen. In Runs Nos. 1 and 2 a stream of pure hydrogen was used. In Runs Nos. 3 to 6 a hydrogen-rich stream was employed containing 95 volume percent hydrogen, 3.5 volume percent methane, 0.4 weight percent propane and 0.1 weight percent butane. The remaining pertinent information relating to the runs is summarized below in Table II.

titanium and molybdenum and that each catalyst reached deactivation (thermal level) at about the same time.

In FIG. III, the hydrogen consumption in Runs Nos. IV, V and VI is plotted against the time on stream. By "hydrogen consumption" we mean the amount of hydrogen reacted with the slurry, expressed as standard cubic feet per ton of coal as received. At the higher pressure each of the catalysts resulted in superior coal hydrogenation. Surprisingly, the run with nickel, titanium and molybdenum produced results far better than those obtainted using nickel, cobalt and molybdenum. The precipitous drop obtained using nickel, titanium and molybdenum at the end of 45 days was due to the loss of intrinsin catalyst activity, but to a number of factors including an electric power failure which resulted in flow stoppage in the reactor, causing the catalyst beds to be clogged. To demonstrate that the catalyst retained activity, the catalyst and the catalyst baskets were mechanically cleaned and the catalyst was screened. The catalyst was not regenerated by thermal or solvent means in any way. Continuation of the run resulted in continued hydrogenation at a level not far below that of the fresh catalyst. At the end of 85 days, the catalyst was still effective, since the level of hydrogenation was far in excess of that obtained thermally.

These results are surprising. On pages 35 and 38 of Coal Structure and Reactivity of G. L. Tingey and J. R. Morrey, published by Battelle Pacific Northwest Laboratories, Battelle Boulevard, Richland, Wash. 99352 (December, 1973), the statement is made that cobalt molybdate catalysts used in hydrogenating coal are poisoned by titanium. This would include the well-known coal hydrogenation catalyst, nickel-cobalt-molybdenum used in Runs Nos. I and IV herein. The catalyst used herein contains two metals common thereto, cobalt and molybdenum, and it would be expected that the association therewith of titanium would negate its use in coal hydrogenation. However, Runs Nos. I to III show that a catalyst containing nickel, titanium and molybdenum can be successfully used for such purposes and in Runs Nos. IV to VI that operation under elevated pressures unexpectedly results in ex-

TABLE II

| Run No. | I | II | III | IV | V | VI |
|---|---|---|---|---|---|---|
| Catalyst Or Packing | NiCoMo | NiTiMo | Quartz Chips | NiCoMo | NiTiMo | Quartz Chips |
| Volume of Catalyst Or Packing, c.c. | 1000 | 1000 | 1140 | 980 | 1086 | 1140 |
| Catalyst Density | 0.73 | 0.82 | 1.82 | 0.73 | 0.82 | 1.58 |
| Liquid Hourly Space Velocity (LHSV) | 1.26 | 0.94 | 0.92 | 0.94 | 0.93 | 1.15 |
| Liquid Feed Rate, Kgs Per Hour | 4.5 | 3.6 | 3.6 | 4.5 | 3.6 | 3.6 |
| Hydrogen Partial Pressure, Pounds Per Square Inch Absolute (Kilograms Per Square Centimeter Absolute) | 3500 (246) | 3500 (246) | 3000 (211) | 3900 (274) | 3900 (274) | 3900 (274) |
| Reactor Temperature, ° C. | 412 | 412 | 417 | 388 | 388 | 388 |

The data obtained for Runs Nos. I, II and III are summarized in FIG. II and for Runs Nos. IV, V and VI in FIG. III. In FIG. II the weight percent hydrogen in the hydrogenated liquid product in Runs Nos. I, II and III is plotted against the time on stream. The amount of hydrogen in the product is a direct function of the extent of hydrogenation obtained during the operation. The catalyst containing nickel, cobalt and molybdenum is an excellent coal hydrogenation catalyst. Note that results obtained using the nickel, titanium and molybdenum are about as good as those obtained using nickel, ceedingly long catalyst life with excellent hydrogenation capabilities.

Obviously, many modifications and variations of the invention, as hereinabove set forth, can be made without departing from the spirit and scope thereof and, therefore, only such limitations should be imposed as are indicated in the appended claims.

We claim:

1. A process for converting a solid carbonaceous material to a liquid product which comprises heating a slurry composed of said solid carbonaceous material and a solvent having hydrogen-transfer properties together with hydrogen in the presence of a substantially phosphate-free catalyst comprising Group VI and Group VIII metals, their oxides or sulfides, with the atomic ratio of said Group VIII metal to said Group VI metal being about 1:0.3 to about 1:5, supported on a non-zeolitic carrier, which catalyst is promoted with about one to about ten weight per cent titanium, at a temperature of about 260° to about 480° C. and a pressure of about 500 to about 10,000 pounds per square inch absolute.

2. The process of claim 1 wherein the temperature is in the range of about 350° to about 450° C. and the pressure in the range of about 3700 to about 6000 pounds per square inch absolute.

3. The process of claim 1 wherein the temperature is in the range of about 350° to about 450° C. and the pressure in the range of about 3800 to about 4000 pounds per square inch absolute.

4. The process of claim 1 wherein the solid carbonaceous product is coal.

5. The process of claim 1 wherein the solvent is anthracene oil.

6. The process of claim 1 wherein the carrier is alumina.

7. The process of claim 1 wherein the Group VI metal is molybdenum and the Group VIII metal is nickel.

8. The process of claim 1 wherein the atomic ratio of said Group VIII metal to said Group VI metal is in the range of about 1:0.5 to about 1:3.5 and the weight per cent of titanium is about 2.5 to about 8.

9. The process of claim 1 wherein said slurry and hydrogen are introduced into a reaction vessel comprising a plurality of closely-spaced reaction zones separated by porous partitions, a portion of said zones containing said catalyst which will not pass through said porous partitions and the remainder of said zones forming substantially unobstructed passageways through said reaction vessel and passing said slurry through said unobstructed passageways and through said porous partitions into contact with said catalyst.

* * * * *